United States Patent [19]

Rielly

[11] 4,146,809
[45] Mar. 27, 1979

[54] SLEEVE FOR A ROTOR OF A DYNAMOELECTRIC MACHINE

[75] Inventor: Donald H. Rielly, Monroeville, Pa.

[73] Assignee: Westinghouse Electric Corp., Pittsburgh, Pa.

[21] Appl. No.: 833,625

[22] Filed: Sep. 15, 1977

[51] Int. Cl.² .............................................. H02K 1/22
[52] U.S. Cl. ..................................... 310/261; 310/61; 310/271
[58] Field of Search ............... 310/261, 260, 270, 271, 310/262, 61, 65, 214, 215

[56] References Cited

U.S. PATENT DOCUMENTS

| | | | |
|---|---|---|---|
| 450,552 | 4/1891 | Atwood | 310/271 UX |
| 459,923 | 9/1891 | Beattie, Jr. | 310/271 |
| 1,555,065 | 9/1925 | Lindquist | 310/214 |
| 1,748,242 | 2/1930 | Papst | 310/271 X |
| 2,303,291 | 11/1942 | Moss | 310/214 UX |
| 2,621,223 | 12/1952 | Vickers et al. | 310/270 X |
| 2,630,463 | 3/1953 | Smith | 310/271 |
| 3,157,806 | 11/1964 | Wiedemann | 310/262 X |

Primary Examiner—Mark O. Budd
Attorney, Agent, or Firm—F. J. Baehr, Jr.

[57] ABSTRACT

A sleeve is utilized to retain the conductors disposed longitudinally on the outer surface of a rotor in a dynamoelectric machine.

5 Claims, 3 Drawing Figures

4,146,809

SLEEVE FOR A ROTOR OF A DYNAMOELECTRIC MACHINE

BACKGROUND OF THE INVENTION

This invention relates to dynamoelectric machines and more particularly to a sleeve for retaining the conductors disposed longitudinally on the outer surface of the rotor of the dynamoelectric machine.

Dynamoelectric machines normally have a stator and a rotor rotatably disposed within the stator. The rotor has windings disposed in slots longitudinally disposed along the rotor. The winding comprises a plurality of conductors disposed in the rotor and end turns which electrically connect the ends of the conductors to one another.

The windings are held in place against centrifugal force produced as the rotor revolves by two separate systems; the portion of the windings in the slots is retained therein by wedges which are dovetailed into the slots, (see U.S. Pat. No. 3,697,761 by Kilgore at al. and U.S. Pat. No. 3,898,491 by Long et al.); the end turns are retained by a ring which is shrunk on the end of the rotor and covers the end turns, (see U.S. Pat. No. 2,712,085 and 2,773,210). A problem with this system is the rotor winding does not have a continuous support which offers uniform stiffness over the entire winding, that is, the deflection of the ring which retains the end turns is different than the deflection of the rotor body and wedges which retain the straight portion of the winding. Because of the differential deflection, stresses are induced in the winding at the juncture of the straight portion and the end turns. To keep these stresses within allowable limits it is necessary to fabricate the winding utilizing multiple layers of copper strips. The relatively thin strips deflect easily keeping the bending stresses within allowable limits. If the differential deflection were reduced, a single integral conductor could be utilized reducing the cost of the dynamoelectric machine.

As generators become larger, it is desirable to pass more current through the rotor winding; the size of the conductor being limited by slot configuration and layout rather than the cross section of the conductor forming the winding.

If the slots are generally eliminated, more space is available for the conductors and cooling fluid. The rotor may also be formed from smaller forgings, which advantageously reduce the cost of the forgings, improve their soundness, and enhance the quality of their inspection.

Utilizing more conductors, more closely spaced would also result in reduced excitation current.

SUMMARY OF THE INVENTION

In general a rotor for a dynamoelectric machine, when made in accordance with this invention, comprises a shaft having a stepped portion, an array of conductors disposed in a spaced relationship on said step portion and extending longitudinally along and radially outwardly from said step portion, a sleeve disposed over the array of conductors and spacers for retaining the conductors in a spaced relationship, whereby additional space is provided for the conductors and for cooling them.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
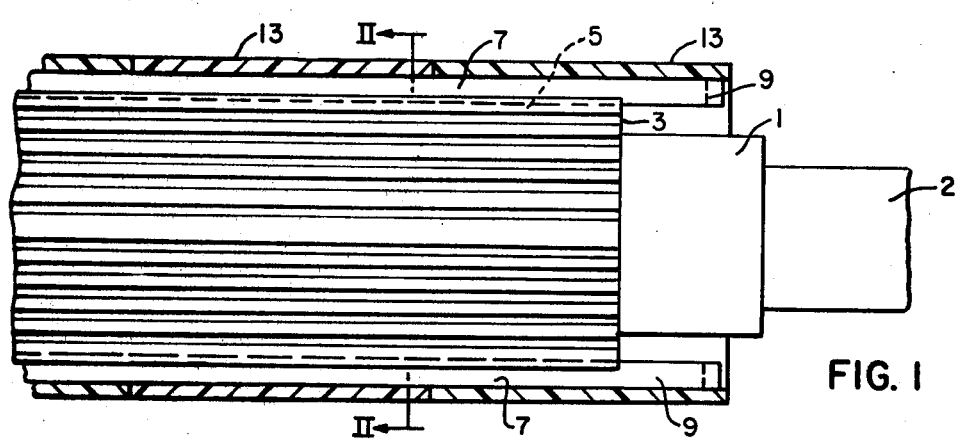
FIG. 1 is a partial sectional view of a rotor made in accordance with this invention.
Figure 2:
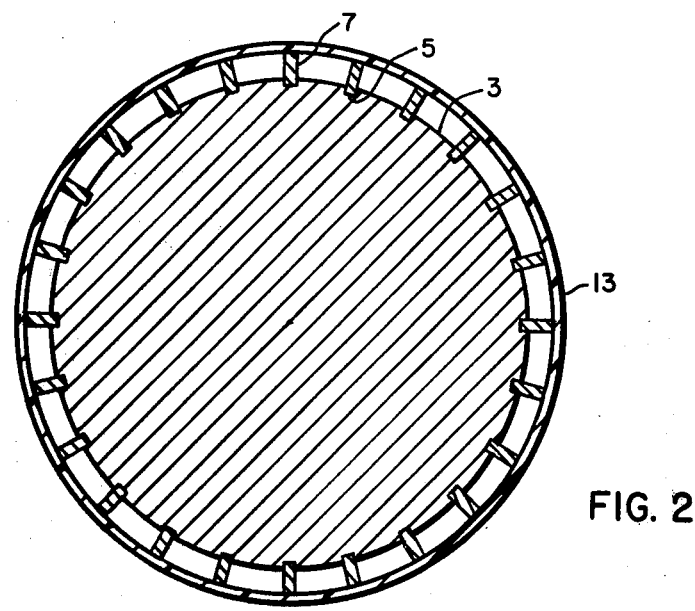
FIG. 2 is a sectional view taken on line II—II of FIG. 1.
Figure 3:
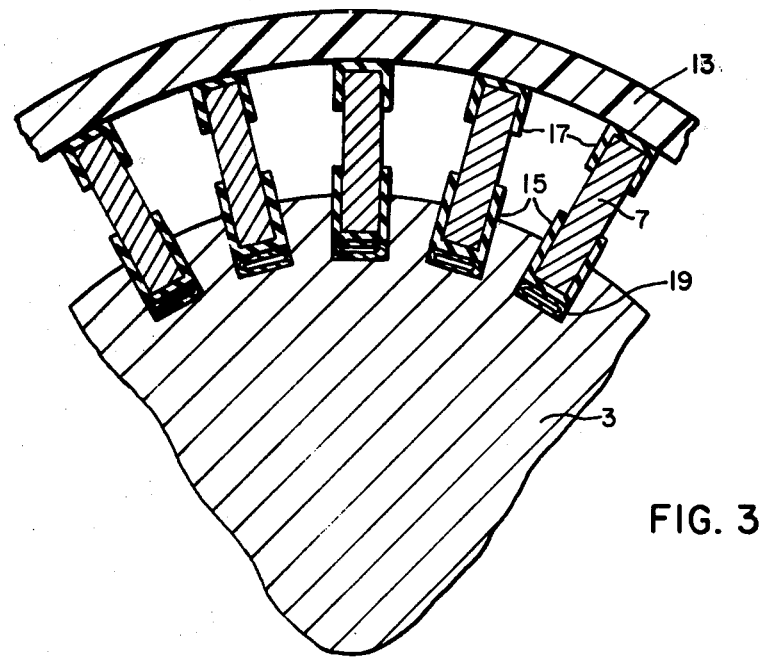
FIG. 3 is an enlarged partial sectional view showing a modification.

Referring now to the drawings in detail and in particular to FIG. 1 there is shown a rotor 1 for a dynamoelectric machine such as a generator, which is utilized with a turbine to make electricity. The rotor 1 comprises a cylindrical shaft 2, which has a plurality of different diameter portions or steps disposed thereon. The outer diameter portion or outer step portion 3 has a plurality of longitudinal or axially oriented grooves or slots 5 disposed therein. Disposed in the grooves 5 are an array of conductor 7 which extend longitudinally the entire length of the grooves 5 and beyond. The ends of the conductors are joined to the ends of other conductors by end turns 9. The conductor 7 and end turns 9 are joined to form a rotor winding 11.

The grooves 5 are shallow and are only sufficiently deep to align the conductor 7 and retain their spaced relationship.

A sleeve 13 in the form of a tubular member encircles the entire winding 11 retaining it on the rotor against the action of centrifugal force as the rotor 1 is rotated. The sleeve 13 may be continuous or made up of a plurality of short segments disposed end to end over the winding 11. In the preferred embodiment, the sleeve 13 is a thin wall tubular member made of a graphite-epoxy composite or other high strength non-magnetic material and the grooves 5 for spacing the conductors are disposed in the outer step portion 3 of the shaft. However, the grooves 5 are not required as spacers or other means could be utilized to maintain a spaced relationship between adjacent conductors 7. The sleeve 13 could also be formed over the winding 11 by wrapping the winding 11 with the graphite-epoxy composite or other suitable material. Temporary spacers could be utilized to maintain the spacing while the sleeve 13 is being formed and then removed once the sleeve 13 is completed.

U-shaped insulators 15 and 17 are disposed, respectively, radially inwardly and radially outwardly of the conductors 7 to electrically insulate the conductors 7 from the shaft 2 and from the sleeve 13.

Disposed radially inwardly of the conductor is a flat tubular member or other biasing means 19 for biasing the conductor 7 toward the sleeve 13 to maintain continuous contact therebetween. The tubular members 19 are supplied with pressurized fluid which tends to expand them, biasing the conductor 7 radially outwardly toward the sleeve 13.

The rotor hereinbefore described is not limited by the allowable slot or grooved size, the cross section of the conductors forming the winding may be much larger allowing the utilization of aluminum conductors, which because of their lower conductivity must be of larger cross section than copper conductors. Because the winding is supported uniformly over its entire expanse, single integral conductors may be utilized rather than stacks of strips of conducting material. The area adjacent each side of the conductor is open allowing for the flow of cooling fluid on each side of the conductor. The outer diameter of the shaft is smaller reducing its cost, producing a sounder forging and facilitating more reliable ultrasonic inspection. Such rotors weigh less and therefore allow the utilization of smaller bearings.

What we claim is:

1. A rotor for a dynamoelectric machine, said rotor comprising a shaft having a stepped portion, and an array of conductors disposed in a spaced relationship on said step portion and extending longitudinally and radially outwardly from said step portion, a sleeve disposed over said array of conductors, a flattened tubular member disposed radially inwardly of the conductors, and means for retaining said conductors in a spaced relationship, whereby additional space is provided for said conductors and for cooling them.

2. A rotor as set forth in claim 1, wherein the tubular member has pressurized fluid disposed therein for expanding the tubular member and biasing the conductor toward the sleeve.

3. A rotor for a dynamoelectric machine, said rotor comprising a shaft having a stepped portion, an array of conductors disposed in a spaced relationship on said stepped portion and extending longitudinally and radially outwardly from said stepped portion, a sleeve disposed over said array of conductors, a plurality of spaced apart longitudinal grooves in the step portion of the shaft, the grooves being sufficiently deep to align the conductors, and means for biasing the conductors toward the sleeve, whereby additional space is provided for said conductors and for cooling them.

4. A rotor for a dynamoelectric machine, said rotor comprising a shaft having a step portion, an array of conductors disposed in a spaced relationship on said stepped portion and extending longitudinally and radially outwardly from said stepped portion, a sleeve disposed over said array of conductors, means for retaining said conductors in a spaced relationship, and means for biasing the conductors toward the sleeve, whereby additional space is provided for said conductors and for cooling them.

5. A rotor for a dynamoelectric machine, said rotor comprising a shaft having a step portion, an array of conductors disposed in a spaced relationship on said step portion and extending longitudinally and radially outwardly from said step portion, a sleeve formed from a graphite epoxy composite disposed over said array of conductors and means for retaining said conductors in a spaced relationship, whereby additional space is provided for said conductors and for cooling them.

* * * * *